O. B. FULLER.
Dough-Machines.

No. 140,695.

Patented July 8, 1873.

Witnesses.
Wm R. Sands.
Thos. S. Crane.

Inventor.
Oakley B Fuller

UNITED STATES PATENT OFFICE.

OAKLEY B. FULLER, OF NEWARK, NEW JERSEY.

IMPROVEMENT IN DOUGH-MACHINES.

Specification forming part of Letters Patent No. 140,695, dated July 8, 1873; application filed June 9, 1873.

*To all whom it may concern:*

Be it known that I, OAKLEY B. FULLER, of Newark, Essex county, New Jersey, have invented certain Improvements in Sheeting-Machines for Dough, of which the following is a specification:

Machines have been used in which a sheet of dough is produced by forcing the dough (by screw-pressure applied to a plunger) through a suitable aperture; but the action of all such machines is necessarily interrupted when the plunger reaches the bottom of the vessel and the dough is all discharged. I have therefore devised the following machine, in which the operation of sheeting the dough can be continued uninterruptedly, as long as the hopper is supplied with dough.

The nature of my invention will be readily understood, upon reference to the accompanying drawing, in which—

Figure 7:
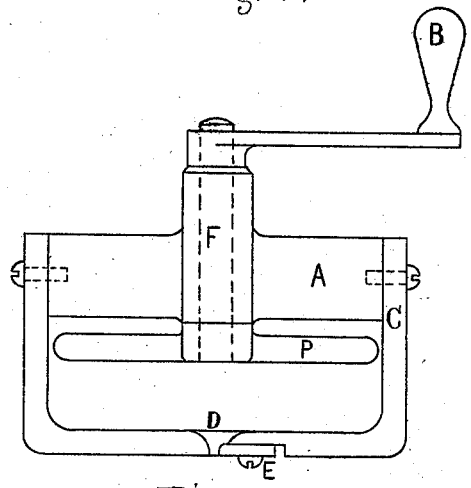
Figure 3:
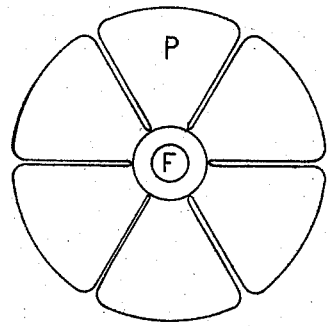
Figure 2:
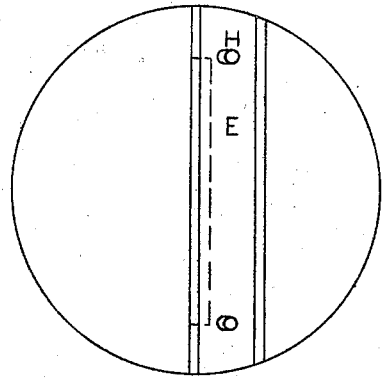
Figure 4:
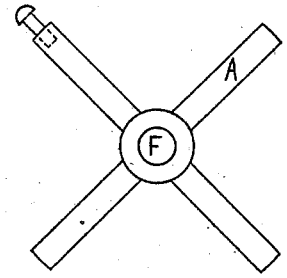

Figure 1 is a sectional elevation of the machine; Fig. 2, a bottom view of the same, showing the adjustable throat; Fig. 3, a plan of the propeller; and Fig. 4, a plan of the holders or partitions.

The machine consists of a circular or cylindrical or conical vessel, in the axis of which a shaft is placed and supported, so that motive power can be applied to the end outside the vessel, and a screw-propeller attached to the end inside the vessel. A longitudinal opening or throat is provided in the vessel opposite the propeller, or in the side, so that any dough set in motion through the machine by the propeller will be forced through this throat and take a section corresponding to its dimensions. To keep the dough placed in the machine from adhering to the propeller and revolving with it, a number of holding-arms or partitions are inserted in the vessel either above or below the propeller, or both, if required. These partitions are shown in the vessel at A and in the plan at Fig. 4. To refer again to the drawings, B represents a handle attached to the central shaft F; C, the vessel of any desired shape; P, the propeller, seen in elevation in Fig. 1 and in plan in Fig. 2. E represents an adjustable jaw secured to or near the throat D, for regulating the thickness of the sheet of dough as it leaves the machine.

The operation of the machine is as follows: Dough is thrown into the machine between the holders or partitions A. Here it falls upon the propeller P, which cuts off portions of it and forces it toward the bottom of the vessel. It has no outlet except through the throat D, and emerges in a sheet whose thickness is equal to the width of the throat.

Having shown the principle upon which I have designed this machine, I claim as new and desire to secure by Letters Patent—

1. The combination of the propeller P, vessel C, and throat D, whether adjustable or not, as shown and described.

2. The combination of the holders or partitions A with the propeller P and vessel C, substantially as shown and described.

OAKLEY B. FULLER.

Witnesses:
WM. R. SANDS,
THOS. S. CRANE.